(No Model.)
J. B. GATHRIGHT.
SUPPORTING BRACE FOR BICYCLES.
No. 537,147. Patented Apr. 9, 1895.
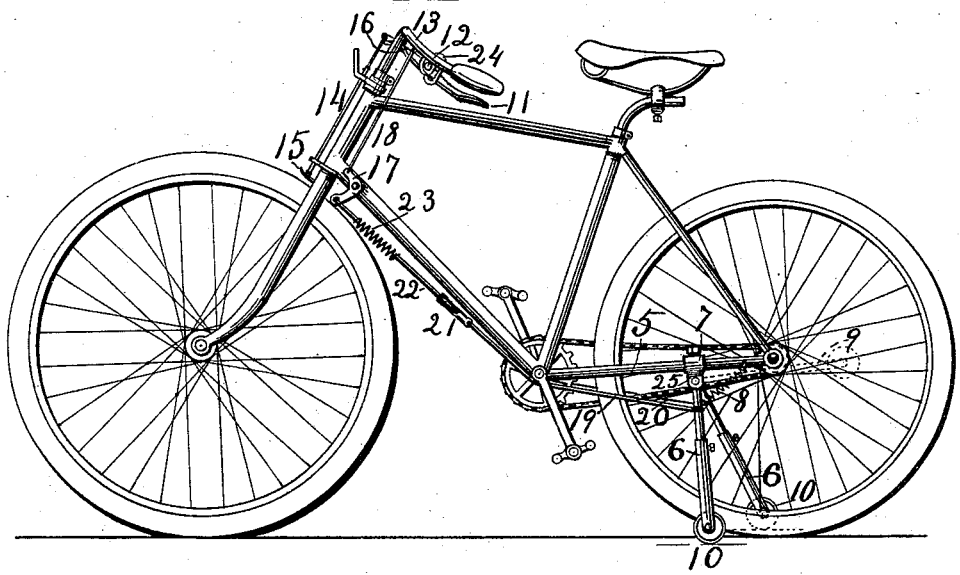
Fig I.
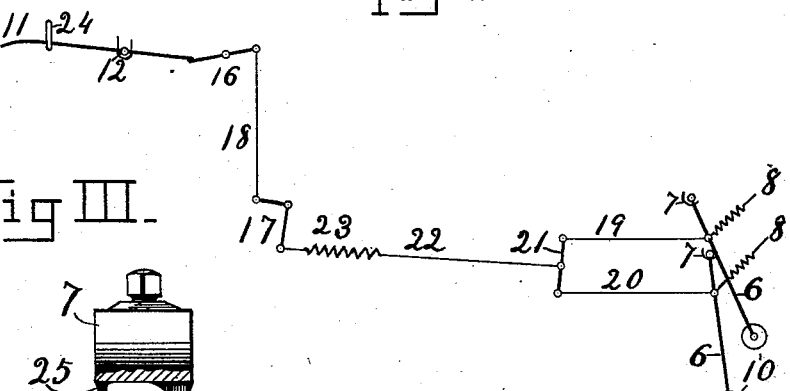
Fig II.
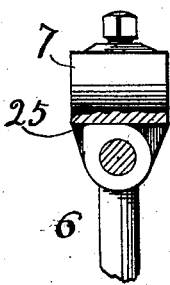
Fig III.
Witnesses,
M. C. Hillyard.
P. E. Stevens.
Inventor.
Josiah B. Gathright.
by W. C. Stevens. Atty.

UNITED STATES PATENT OFFICE.

JOSIAH B. GATHRIGHT, OF LOUISVILLE, KENTUCKY.

SUPPORTING-BRACE FOR BICYCLES.

SPECIFICATION forming part of Letters Patent No. 537,147, dated April 9, 1895.

Application filed August 14, 1894. Serial No. 520,283. (No model.)

*To all whom it may concern:*

Be it known that I, JOSIAH B. GATHRIGHT, a citizen of the United States, residing at Louisville, in the county of Jefferson and State of Kentucky, have invented a new and useful Improvement in Supporting-Braces for Bicycles; and I do hereby declare the following to be a full, clear, and exact description of the same, reference being had to the accompanying drawings, in which—

Figure I, represents a bicycle in side elevation showing my stand still brace in position for service on ground slanting toward the spectator. Fig. II, is a diagram of the operative parts projected upon a vertical plane. Fig. III represents a detail partly broken away, on an enlarged scale.

5 represents the side bars of a bicycle of any pattern; the one selected for the present illustration being a common safety bicycle.

6, 6 are braces pivotally hung in clips 7, which are screw-clamped upon the side bars 5.

8, 8 are springs hung between each side bar 5 and the adjacent brace 6 to hold the braces normally raised in the position shown in dotted lines 9. I prefer to make each brace telescopically adjustable so that it may be shortened or lengthened to accommodate the slight variation in height of different makes of machines; and to provide each brace with a foot wheel 10 adapted to roll on the ground when the brace is forced down while the bicycle is traveling.

11 is a common brake lever pivoted at 12 to the handle bar 13, and connected with the brake 15 in any usual manner such as by a push rod 14.

16 is an elbow lever pivoted to the handle bar with one end bearing against the brake lever and the other end connected with an elbow lever 17 by a wire 18.

19 and 20 are wires, each attached at one end to one of the braces 6, and at the other end to an equalizing bar 21.

22 is a connection between the equalizing bar 21 and the elbow lever 17, and I may interpose a spring 23 in this connection.

24 is a ring loosely mounted around the handle bar and the brake lever. In adapting the braces to a bicycle each brace should be adjusted to a length about one inch longer than will swing down to a vertical position when the bicycle stands on level ground, in order that either brace may reach the ground when it slants away from that side.

The operation is as follows: If the brake lever be pressed up to the handle-bar the intermediate connections will pull forward upon the equalizing bar 21 until the two braces bear their wheels 10 upon the ground. Then if the ring 24 be slid over the brake lever it will be retained in the position to hold the braces down. In this position the bicycle will stand still for mounting or dismounting, or it may be left so standing. Each brace is provided with a shoulder at 25 to prevent it from being swung farther forward than vertical, and the springs 8 act to return the braces to their normal horizontal position as soon as released from service. If the ground is uneven that brace which is on the highest side will strike the ground first but the action of the brake lever is enough to pull both braces forward to a vertical position so the equalizer pulls the free brace forward on the down-hill side until it strikes the ground and the spring 23 accommodates the hanging backward of the brace on the up-hill side. The braces may be thus operated to act on the ground as brakes to stop the bicycle and it is not necessary to my invention that the lever 11 shall be connected with a common bicycle brake, though I prefer that construction as it simplifies the machine and it operates my braces by the usual act of applying the brake, and at the right time not only to aid the common brake in stopping the bicycle but at the right time to hold the bicycle standing when thus stopped. This device enables the rider to stop and sit still without dismounting and to start again at will, and it also holds the bicycle upright while the rider mounts or dismounts.

Having thus fully described my invention, what I believe to be new, and desire to secure by Letters Patent, is the following:

1. The combination of a bicycle; two braces pivotally hung to opposite sides of the frame thereof to swing downward and forward; levers pivoted to the handle bar, an equalizing bar hung at its ends to the said braces respectively, and connections between the middle of the said equalizing bar and the said levers on the handle bar, substantially as described.

2. The combination of a bicycle; braces hung at opposite sides thereof; an operating lever; an equalizing bar and connections between the operating lever and the middle of the equalizing bar, and other connections between the ends of the said equalizing bar and braces, substantially as described.

3. The combination of a bicycle; braces hung at opposite sides thereof; an operating lever; an equalizing bar; connections between the said bar and braces, and between the bar and lever and a spring in the line of connections, substantially as described.

In testimony whereof I affix my signature in presence of two witnesses.

JOSIAH B. GATHRIGHT.

Witnesses:
E. S. FOOTE,
CHAS. A. GRAHAM, Jr.